US008675881B2

(12) United States Patent
Hultz et al.

(10) Patent No.: US 8,675,881 B2

(45) Date of Patent: Mar. 18, 2014

(54) ESTIMATION OF SYNTHETIC AUDIO PROTOTYPES

(75) Inventors: Paul B. Hultz, Brookline, NH (US); Tobe Z. Barksdale, Bolton, MA (US); Michael S. Dublin, Cambridge, MA (US); Luke C. Walters, Miami, FL (US)

(73) Assignee: Bose Corporation, Framingham, MA (US)

( * ) Notice: Subject to any disclaimer, the term of this patent is extended or adjusted under 35 U.S.C. 154(b) by 588 days.

(21) Appl. No.: 12/909,569

(22) Filed: Oct. 21, 2010

(65) Prior Publication Data

US 2012/0099731 A1 Apr. 26, 2012

(51) Int. Cl.
*H04R 5/00* (2006.01)
*H04B 1/00* (2006.01)

(52) U.S. Cl.
USPC .................................. 381/17; 381/27; 381/119

(58) Field of Classification Search
USPC .................................. 381/17, 92, 119, 18, 27
See application file for complete search history.

(56) References Cited

U.S. PATENT DOCUMENTS 5,315,532 A 5/1994 Comon
6,002,776 A 12/1999 Bhadkamkar et al.
6,317,703 B1 11/2001 Linsker
6,321,200 B1 11/2001 Casey
7,359,520 B2 4/2008 Brennan et al.
7,593,535 B2 9/2009 Shmunk
7,630,500 B1 * 12/2009 Beckman et al. ............... 381/18
2006/0045294 A1 3/2006 Smyth
2008/0112574 A1 5/2008 Brennan et al.
2008/0152155 A1 6/2008 Avendano et al.
2008/0170718 A1 7/2008 Faller
2008/0317260 A1 12/2008 Short
2009/0067642 A1 3/2009 Buck et al.
2009/0110203 A1 4/2009 Taleb
2009/0222272 A1 * 9/2009 Seefeldt et al. ............... 704/500
2009/0252341 A1 * 10/2009 Goodwin ........................ 381/56
2009/0262969 A1 10/2009 Short et al.
2011/0013790 A1 * 1/2011 Hilpert et al. ................. 381/300
2011/0238425 A1 * 9/2011 Neuendorf et al. ........... 704/500
2011/0305352 A1 * 12/2011 Villemoes et al. .............. 381/98
2012/0039477 A1 * 2/2012 Schijers et al. ................. 381/22

FOREIGN PATENT DOCUMENTS

EP 1 374 399 12/2005
EP 1 853 093 11/2007
WO 2008/155708 12/2008

OTHER PUBLICATIONS

Christof Faller "Multiple-Loudspeaker Playback of Stereo Signals". J. Audio Eng. Soc., vol. 54, No. 11, Nov. 2006, pp. 1051-1064.

* cited by examiner

*Primary Examiner* — Ahmad Matar
*Assistant Examiner* — Katherine Faley
(74) *Attorney, Agent, or Firm* — Occhiuti & Rohlicek LLP

(57) ABSTRACT

An approach to forming output signals both permits flexible and temporally and/or frequency local processing of input signals while limiting or mitigating artifacts in such output signals. Generally, the approach involves first synthesizing prototype signals for the output signals, or equivalently characterizing such prototypes, for example, according to their statistical characteristics, and then forming the output signals as estimates of the prototype signals, for example, as weighted combinations of the input signals.

32 Claims, 10 Drawing Sheets

ESTIMATION OF SYNTHETIC AUDIO PROTOTYPES

CROSS-REFERENCE TO RELATED APPLICATIONS

This application is related to, but does not claim the benefit of the filing dates of, the following applications, which are incorporated herein by reference:

U.S. Pat. No. 7,630,500, titled "Spatial Disassembly Process," issued on Dec. 8, 2009; and U.S. Patent Pub. 2009/0262969, titled "Hearing Assistance Apparatus," published on Oct. 22, 2009.

U.S. Patent Pub. 2008/0317260, titled "Sound Discrimination Method and Apparatus," published on Dec. 25, 2008.

BACKGROUND

This invention relates to estimation of synthetic audio prototypes.

In the field of audio signal processing, the term "upmixing" generally refers to the process of undoing "downmixing", which is the addition of many source signals into fewer audio channels. Downmixing can be a natural acoustic process, or a studio combination. As an example, upmixing can involve producing a number of spatially separated audio channels from a multichannel source.

The simplest upmixer takes in a stereo pair of audio signals and generates a single output representing the information common to both channels, which is usually referred to as the center channel. A slightly more complex upmixer might generate three channels, representing the center channel and the "not center" components of the left and right inputs. More complex upmixers attempt to separate one or more center channels, two "side-only" channels of panned content, and one or more "surround" channels of uncorrelated or out of phase content.

One method of upmixing is performed in the time domain by creating weighted (sometimes negative) combinations of stereo input channels. This method can render a single source in a desired location, but it may not allow multiple simultaneous sources to be isolated. For example, a time domain upmixer operating on stereo content that is dominated by common (center) content will mix panned and poorly correlated content into the center output channel even though this weaker content belongs in other channels.

A number of stereo upmixing algorithms are commercially available, including Dolby Pro Logic II (and variants), Lexicon's Logic 7 and DTS Neo:6, Bose's Videostage, Audio Stage, Centerpoint, and Centerpoint II.

There is a need to perform upmixing in a manner that accurately renders spatially separated audio channels from a multichannel source in a manner that reduces sonic artifacts and has low processing latency.

SUMMARY

One or more embodiments address a technical problem of synthesizing output signals that both permit flexible and temporal and/or frequency local processing while limiting or mitigating artifacts in such output signals. Generally, this technical problem can be addressed by first synthesizing prototype signals for the output signals (or equivalently signals and/or data characterizing such prototypes, for example, according to their statistical characteristics), and then forming the output signals as estimates of the prototype signals, for example, formed as weighted combinations of the input signals. In some examples, the prototypes are nonlinear functions of the inputs and the estimates are formed according to a least squared error metric.

This technical problem can arise in a variety of audio processing applications. For instance, the process of upmixing from a set of input audio channels can be addressed by first forming the prototypes for the upmixed signals, and then estimating the output signals to most closely match the prototypes using combinations of the input signals. Other applications include signal enhancement with multiple microphone inputs, for example, to provide directionality and/or ambient noise mitigation in a headset, handheld microphone, in-vehicle microphone, etc., that have multiple microphone elements.

In one aspect, in general, a method for forming output signals from a plurality of input signals includes determining a characterization of a synthesis of one or more prototype signals from multiple of the input signals. One or more output signals are formed, including forming each output signal as an estimate of a corresponding one of the one or more prototype signals comprising a combination of one or more of the input signals.

Aspects may include one or more of the following features.

Determining the characterization of the synthesis of the prototype signals includes determining the prototype signals, or includes determining statistical characteristics of the prototype signals.

Determining the characterization of a synthesis of prototype signal includes forming said data based on a temporally local analysis of the input signals. In some examples, determining the characterization of a synthesis of prototype signal further includes forming said data based on a frequency local analysis of the input signals. In some examples, the forming of the estimate of the prototype is based on a more global analysis of the input and prototype signals than the local analysis in forming the prototype signal.

The synthesis of a prototype signal includes a non-linear function of the input signals and/or a gating of one or more of the input signals.

Forming the output signal as an estimate of the prototype includes forming minimum error estimate of the prototype. In some examples, forming the minimum error estimate comprises forming a least-squared error estimate.

Forming the output signal as an estimate of a corresponding one of the one or more prototype signals, as a combination of one or more of the input signals, including computing estimates of statistics relating the prototype signal and the one or more input signals, and determining a weighting coefficient to apply to each of said input signals.

The statistics include cross power statistics between the prototype signal and the one or more input signals, auto power statistics of the one or more input signals, and cross power statistics between all of input signals, if there is more than one.

Computing the estimates of the statistics includes averaging locally computed statistics over time and/or frequency.

The method further comprises decomposing each input signal into a plurality of components Determining the data characterizing the synthesis of the prototype signals includes forming data characterizing component decompositions of each prototype signal into a plurality of prototype components.

Forming each output signal as an estimate of a corresponding one of the prototype signals includes forming a plurality of output component estimates as transformations of corresponding components of one or more input signals Forming the output signals includes combining the formed output component estimates to form the output signals.

Forming the component decomposition includes forming a frequency-based decomposition.

Forming the component decomposition includes forming a substantially orthogonal decomposition.

Forming the component decomposition includes applying at least one of a Wavelet transform, a uniform bandwidth filter bank, a non-uniform bandwidth filter bank, a quadrature mirror filterbank, and a statistical decomposition.

Forming a plurality of output component estimates as combination of correspond components of one or more input signals comprises scaling the components of the input signals to form the components of the output signals.

The input signals comprise multiple input audio channels of an audio recording, and wherein the output signals comprise additional upmixed channels. In some examples, the multiple input audio channels comprise at least a left audio channel and a right audio channel, and wherein the additional upmixed channels comprise at least one of a center channel and a surround channel.

The plurality of input signals is accepted from a microphone array. In some examples, the one or more prototype signals are synthesized according to differences among the input signals. In some examples, the prototype signal is formed according differences among the input signals includes determining a gating value according to gain and/or phase differences and the gating value is applied to one or more of the input signals to determine the prototype signal.

In another aspect, in general, a system for processing a plurality of input signals to form an output as an estimate of a synthetic prototype signal is configured to perform all the steps of any of the methods specified above.

In another aspect, in general, software, which may be embodied on a machine-readable medium, includes instructions for processing a plurality of input signals to form an output as an estimate of a synthetic prototype signal is configured to perform all the steps of any of the methods specified above.

In another aspect in general, a system for processing a plurality of input signals comprises a prototype generator configured to accept multiple of the input signals and to provide a characterization of a prototype signal. An estimator is configured to accept the characterization of the prototype signal and to form an output signal as an estimate of the prototype signal as a combination of one or more of the input signals.

Aspects can include one or more of the following features.

The prototype signal comprises a non-linear function of the input signals.

The estimate of the prototype signal comprises a least squared error estimate of the prototype signal.

The system includes a component analysis module for forming a multiple component decomposition of each of the input signals, and a reconstruction module for reconstructing the output signal from a component decomposition of the output signal.

The prototype generator and the estimator are each configured to operate on a component by component basis.

The prototype generator is configured, for each component, to perform a temporally local processing of the input signals to determine a characterization of a component of the prototype signal.

The prototype generator is configured to accept multiple input audio channels, and wherein the estimator is configured to provide an output signal comprising an additional upmixed channel.

The prototype generator is configured to accept multiple input audio channels from a microphone array, and wherein the prototype generator is configured to synthesize one or more prototype signals according to differences among the input signals.

An upmixing process may include converting the input signals to a component representation (e.g., by using a DFT filter bank). A component representation of each signal may be created periodically over time, thereby adding a time dimension to the component representation (e.g., a time-frequency representation).

Some embodiments may use heuristics to nonlinearly estimate a desired output signal as a prototype signal. For example, a heuristic can determine how much of a given component from each of the input signals to include in an output signal.

The results that can be achieved by nonlinearly generating coefficients (i.e., nonlinear prototypes) independently across time and frequency can be satisfactory when a suitable filter bank is employed.

Approximation techniques (e.g., least-squares approximation) may be used to project the nonlinear prototypes onto the input signal space, thereby determining upmixing coefficients. The upmixing coefficients can be used to mix the input signals into the desired output signals.

Smoothing may be used to reduce artifacts and resolution requirements but may slow down the response time of existing upmixing systems. Existing time-frequency upmixers require difficult trade-offs to be made between artifacts and responsiveness. Creating linear estimates of synthesized prototypes makes these trade-offs less severe.

Embodiments may have one or more of the following advantages.

The nonlinear processing techniques used in the present application offer the possibility to perform a wide range of transforms that might not otherwise be possible by using linear processing techniques alone. For example, upmixing, modification of room acoustics, and signal selection (e.g., for telephone headsets and hearing aids) can be accomplished using nonlinear processing techniques without introducing objectionable artifacts.

Linear estimation of nonlinear prototypes of target signals allows systems to quickly respond to changes in input signals while introducing a minimal number of artifacts.

Other features and advantages of the invention are apparent from the following description, and from the claims.

DESCRIPTION

1 System Overview

Figure 1:
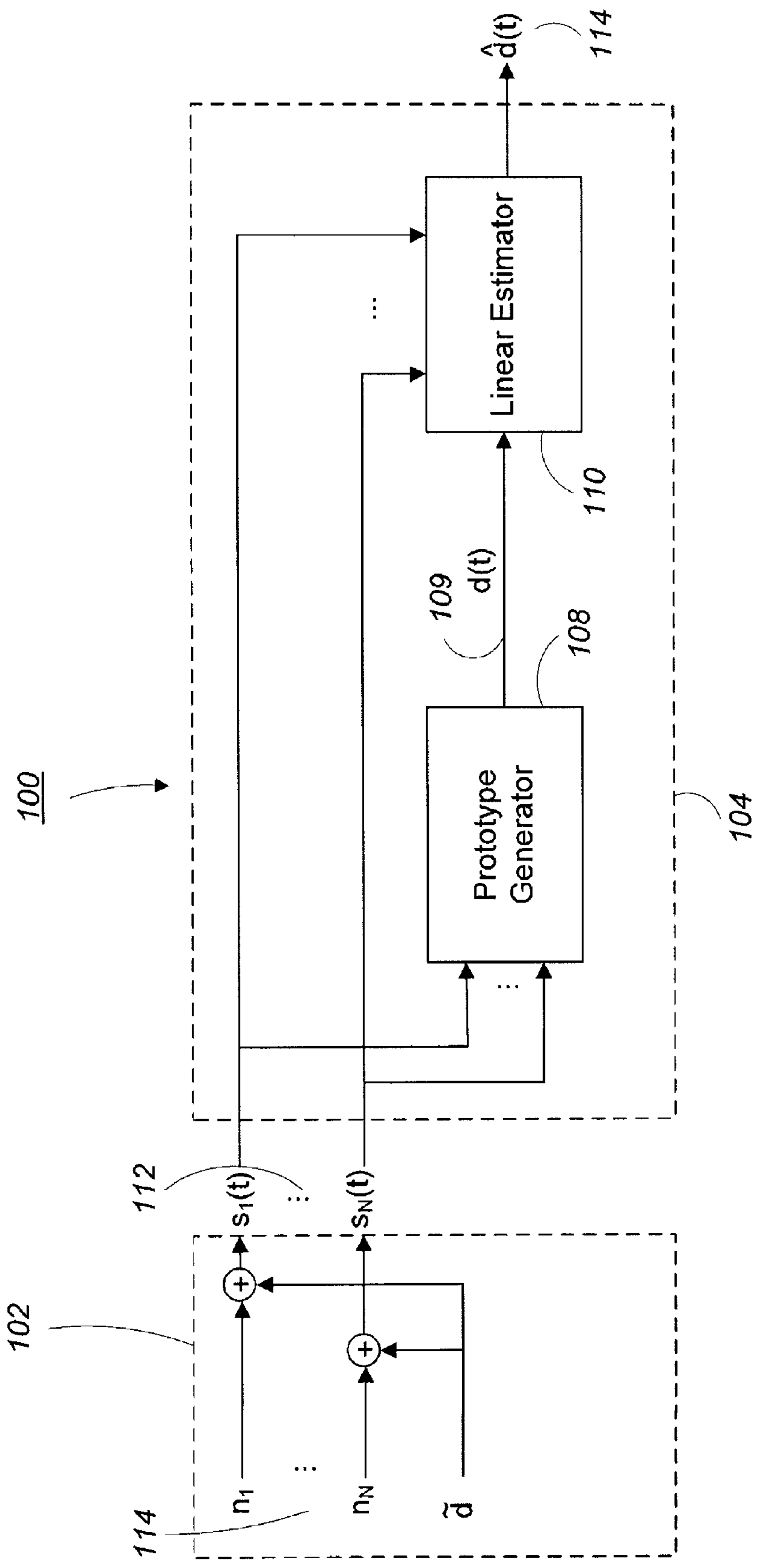
FIG. 1 is a block diagram of a system configured for linear estimation of synthetic prototypes.

Referring to FIG. 1, an example of a system that makes use of estimation of synthetic prototypes is an upmixing system 100 that includes an upmix module 104, which accepts input signals 112 $s_1(t), \ldots, s_N(t)$ and outputs an upmixed signal $\hat{d}(t)$. As an example, input time signals $s_1(t)$ and $s_2(t)$ represent left and right input signals, and $\hat{d}(t)$ represents a derived center channel. The upmix module 104 forms the upmixed signal $\hat{d}(t)$ as a combination of the input signals $s_1(t), \ldots, s_N(t)$ 112, for instance as a (time varying) linear combination of the input signals. Generally, the upmixed signal $\hat{d}(t)$ is formed by an estimator 110 as a linear estimate of the prototype signal d(t) 109, which is formed from the input signals by a prototype generator 108, generally by a non-linear technique. In some examples, the estimate is formed as a linear (e.g., frequency weighted) combination of the input signals that best approximates the prototype signal in a minimum mean-squared error sense. This linear estimate $\hat{d}(t)$ is generally based on a generative model 102 for the set of input signals 112 as being formed as a combination of an obscured target signal $\tilde{d}(t)$ and noise components 114 each associated with one of the input signal 112.

In the system 100 shown in FIG. 1, a synthetic prototype generation module 108 forms the prototype d(t) 109 as non-linear transformations of the set of input signals 112. It should be recognized that the prototype can also be formed using linear techniques, as an example, with the prototype being formed from a different subset of the input signals than is used to estimate the output signal from the prototype. For certain types of prototype generation, the prototype may include degradation and/or artifacts that would produce low quality audio output if presented directly to a listener without passing through the linear estimator 110. As introduced above, in some examples, the prototype d(t) is associated with a desired upmixing of input signals. In other examples, the prototype is formed for other purposes, for example, based on an identification of a desired signal in the presence of interference.

In some embodiments, the process of forming the prototype signal is more localized in time and/or frequency than is the estimation process, which may introduce a degree of smoothness that can compensate for unpleasant characteristics in the prototype signal resulting from the localized processing. On the other hand, the local nature of the prototype generation provides a degree of flexibility and control that enables forms of processing (e.g., upmixing) that are otherwise unattainable.

2 Component Decomposition

In some implementations, the upmixing module 104 of the upmixing system 100 illustrated in FIG. 1 is implemented by breaking each input signal 112 into components (e.g., frequency bands) and processing each component individually. For example, in the case of orthogonal components, the linear estimator 110 can be implemented by independently forming an estimate of each orthogonal component, and then synthesizing the output signal from the estimated components. It should be understood that although the description below focuses on components formed as frequency bands of the input signals, other decompositions into orthogonal or substantially independent components may be equivalently used. Such alternative decomposition may include Wavelet transform of the input signals, non-uniform (e.g., psychoacoustic critical bands; octaves) filter banks, perceptual component decomposition, quadrature mirror filterbanks, statistical (e.g., principal components) based decompositions, etc.

Figure 2:
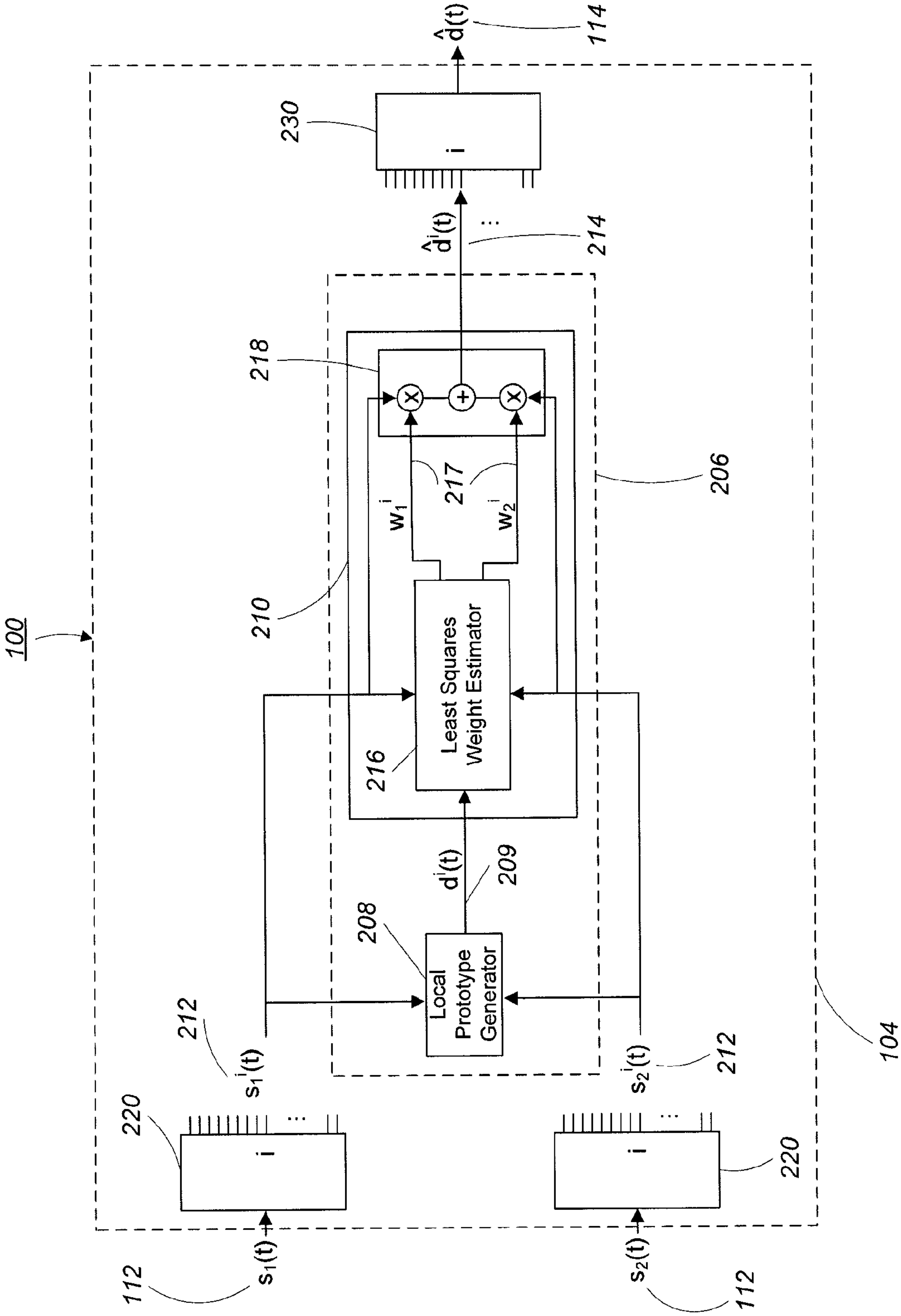
FIG. 2 is a block diagram of the decomposition of signals into components and estimation of a synthetic prototype for a representative component.

Referring to FIG. 2, one embodiment of an upmixing module 104 is configured to process decompositions of the input signals (in this example two input signals) in a manner similar to that described in U.S. Pat. No. 7,630,500, titled "Spatial Disassembly Process," which is incorporated herein by reference. Each of the input signals 112 is transformed into a multiple component representation with individual components 212. For instance, the input signal $s_1(t)$ is decomposed into a set of components $s_1^i(t)$ indexed by i. In some examples, and as described in the above-referenced patent, component analyzer 220 is a discrete Fourier transform (DFT) analysis filter bank that transforms the input signals into frequency components. In some examples, the frequency components are outputs of zero-phase filters, each with an equal bandwidth (e.g., 125 Hz).

The output signal $\hat{d}(t)$ is reconstructed from a set of components $\hat{d}^i(t)$ using a reconstruction module 230. The component analyzers 220 and the reconstruction module 230 are such that if the components are passed through without modification, the originally analyzed signal is essentially (i.e., not necessarily perfectly) reproduced at the output of the reconstruction module 230.

In some embodiments, the component analyzer 220 windows the input signals 112 into time blocks of equal size, which may be indexed by n. The blocks may overlap (i.e., part of the data of one block may also be contained in another block), such that each window is shifted in time by a "hop size" $\tau$. As an example, a windowing function (e.g., square root Hanning window) may be applied to each block for the purpose of improving the resulting component representations 222. Following applying the windowing function to the blocks, the component analyzer 220 may zero pad each block of the input signals 112 and then decompose each zero padded block into their respective component representations. In some embodiments, the components 212 form base band signals, each modulated by a center frequency (i.e., by a complex exponential) of the respective center frequencies of the filter bands. Furthermore each component 212 may be downsampled and processed at a lower sampling rate sufficient for the bandwidth of the filter bands. For example, the output of a DFT filter bank band-pass filter with a 125 Hz bandwidth may be sampled at 250 Hz without violating the Nyquist criterion.

In some examples, the input signals are sampled at 44.1 KHz, and shifted into frames of length 23.2 ms., or 1024 samples, that are selected at a frame hop period of $\tau$=11.6 ms, or 512 samples. Each frame is multiplicatively windowed by a window function of $\sin(\pi \cdot t)/\tau$, where t=0 indexes the beginning of the frame. The windowed frame forms the input to a 1024_point FFT. Each frequency component is formed from one output of the FFT. (Other windows may be chosen that are shorter of longer than the input length of the FFT. If the input window is shorter than the FFT, the data can be zero-extended to fit the FFT; if the input window is longer than the FFT, the data can be time-aliased.)

In FIG. 2, the windowing of the input signals, and the subsequent overlap adding of the output signals is not illustrated. Therefore, the figure should be understood as explicitly illustrating the processing of a single analysis window. More precisely, given the continuous input signal $s_k(t)$, for the $n^{th}$ analysis window, a windowed signal $s_{k,[n]}(t)=s_k(t)w(t-n\tau)$ is formed, where the window may be defined as $w(t)=\sin(\pi\cdot t)/\tau$ These windowed signals are shown without subscripts [n] in FIG. 2. The components of a signal are then defined to decompose each signal as $s_{k,[n]}(t)=\Sigma_i s_{k,[n]}{}^i(t)e^{j\omega_i t}$. The resulting output signals $\hat{d}(t)$ for the analysis periods are then combined as $\hat{d}(t)=\Sigma_n \hat{d}_{[n]}(t)w(t-n\tau)$.

3 Prototype Synthesis

As introduced above, one approach to synthesis of prototype signals is on a component-by-component basis, and in particular in a component-local basis such that each component for each window period is processed separately to form one or more prototypes for that local component.

In FIG. 2, a component upmixer 206 processes a single pair of input components, $s_1{}^i(t)$ and $s_2{}^i(t)$ to form an output component $\hat{d}^i(t)$. The component upmixer 206 includes a component-based local prototype generator 208 which determines a prototype signal component $d^i(t)$ (typically at the down-sampled rate) from the input components $s_1{}^i(t)$ and $s_2{}^i(t)$. In general, the prototype signal component is a non-linear combination of the input components. As discussed further below, a component-based linear estimator 210, then estimates the output component $\hat{d}^i(t)$.

The local prototype generator 208 can make use of synthesis techniques that offer the possibility to perform a wide range of transforms that might not otherwise be possible by using linear processing techniques alone. For example, upmixing, modification of room acoustics, and signal selection (e.g., for telephones and hearing aids) can all be accomplished using this class of synthetic processing techniques.

In some embodiments, the local prototype signal is derived based on knowledge, or an assumption, about the characteristics of the desired signal and undesired signals, as observed in the input signal space. For instance, the local prototype generator selects inputs that display the characteristics of the desired signal and inhibits inputs that do not display the desired characteristics. In this context, selection means passing with some pre-defined maximum gain, example unity, and in the limit, inhibition means passing with zero gain. Preferred selection functions may have a binary characteristic (pass region with unity gain, reject region with zero gain) or a gentle transition between passing signals with desired characteristics and rejecting signals with undesired characteristics. The selection function may include a linear combination of linearly modified inputs, one or more nonlinearly gated inputs, multiplicative combinations of inputs (of any order) and other nonlinear functions of the inputs.

In some embodiments, the synthetic prototype generator 208 generates what are effectively instantaneous (i.e., temporally local) "guesses" of signal desired at the output, without necessarily considering whether a sequence of such guesses would directly synthesize an artifact-free signal.

In some examples, approaches described in U.S. Pat. No. 7,630,500, which is incorporated by reference, that are used to compute components of an output signal are used in the present approaches to compute components of a prototype signal, which are then subject to further processing. Note that in such examples, the present approaches may differ from those described in the referenced patent in characteristics such as the time and/or frequency extent of components. For instance, in the present approach, the window "hop rate" may be higher, resulting a more temporally local synthesis of prototypes, and in some synthesis approaches, such a higher hop rate might result in more artifacts if the approaches described in the referenced patent were used directly.

Figure 4A:
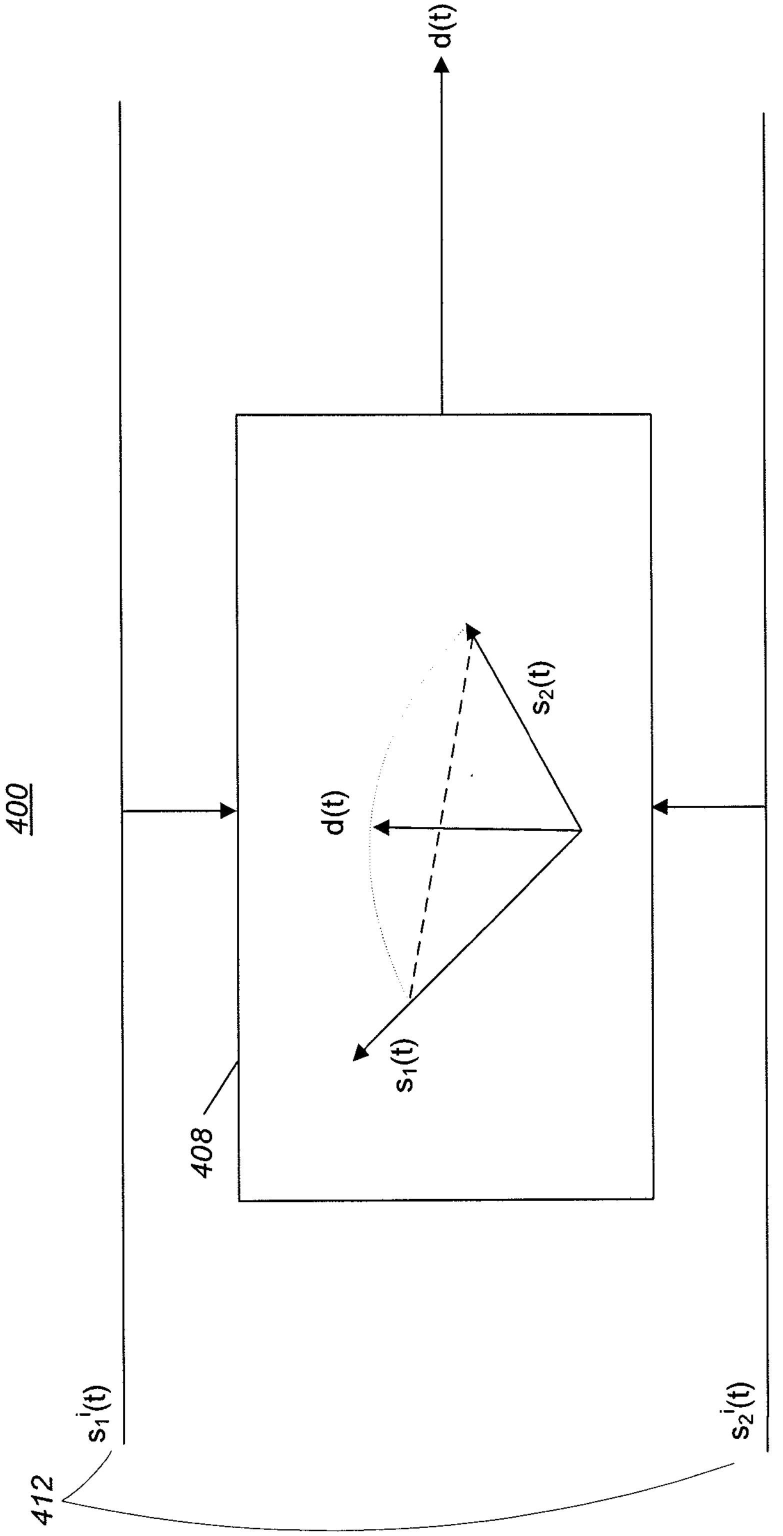
FIG. 4A is a block diagram showing an exemplary center channel synthetic prototype $d^i(t)$.

Referring to FIG. 4A, one exemplary multiple input local prototype $d^i(t)$ generator 408 (an instance of the non-linear prototype generator 208 shown in FIG. 2) for a center channel is illustrated in the complex plane for a single time value. A formula, which is applied independently for each component, defines this particular local prototype:

$$d(t) = \frac{1}{2}\left(\frac{s_1(t)}{|s_1(t)|} + \frac{s_2(t)}{|s_2(t)|}\right)\min(|s_1(t)|, |s_2(t)|)$$

where the component index i is omitted in the formula above for clarity. Note that this example is a special case of an example shown in U.S. Pat. No. 7,630,500 at equation (16), in which $\beta=\sqrt{2}/2$.

Note that the input signals 412, $s_1{}^i(t)$ and $s_2{}^i(t)$ are complex signals due to their base-band representations. The above formula indicates that the center local prototype $d^i(t)$ is the average of equal-length parts of the two complex input signals 412. In other words, of the two inputs 412, the one with the larger magnitude is scaled by a real coefficient to match the length of the smaller, and then the average of the two is taken. This local prototype signal has a selection characteristic such that its output is largest in magnitude when the two inputs 412 are in phase and equal in level, and it decreases as the level and phase differences between the signals increase. It is zero for "hard-panned" and phase-reversed left and right signals. Its phase is the average of the phase of the two input signals. Thus the vector gating function can generate a signal that has a different phase than either of the original signals, even though the components of the vector gating factor are real-valued.

Figure 5:
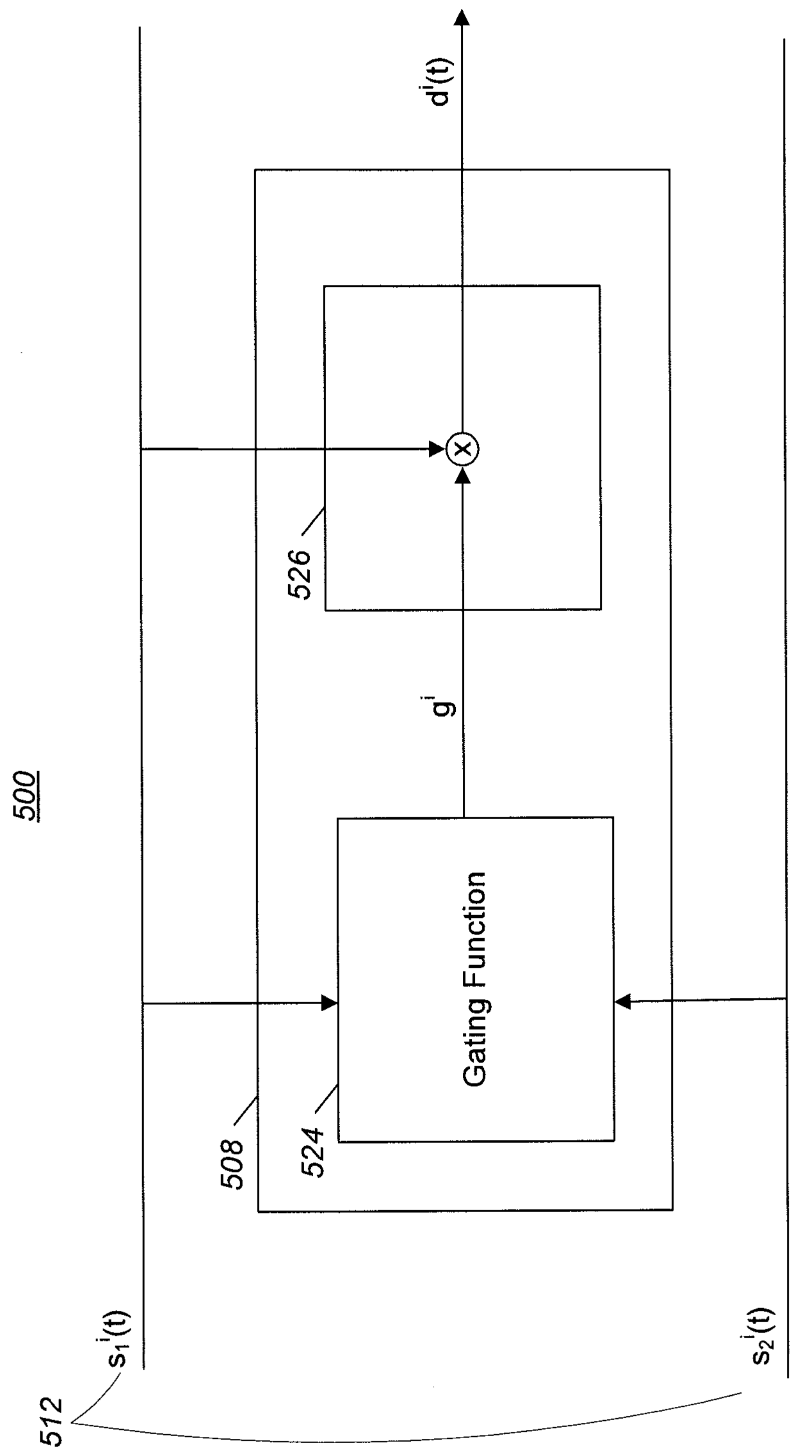
FIG. 5 is a block diagram of an alternative configuration of the synthetic processing module.

Referring to FIG. 5, another example of a prototype generation module 508 (which is another instance of the prototype generator 208 shown in FIG. 2) includes a gating function 524 and a scaler 526. The gating function 524 module accepts the input signals 512 and uses them to determine a gating factor $g^i$, which is kept constant during the analysis interval corresponding to one windowing of the input signal. The gating function module 524 may be switched between 0 and 1 based on the input signals 512. Alternatively, the gating function module 524 may implement a smooth slope, where the gating is adjusted between 0 and 1 based on the input signals 512 and/or their history over many analysis windows. One of the input signals 512, for instance $s_1{}^i(t)$, and gating factor g are applied to scaler 526 to yield local prototype d(t). This operation dynamically adjusts the amount of input signal 512 that is included in the output of the system. Because g is a function of $s_1$, d(t) is not a linear function of $s_1$, and is thus the local prototype is a non-linear modification of $s_1$ that has a dependency on $s_2$. Because the gating factor is real only, the local prototype, d, has the same phase as $s_1$; only its magnitude is modified. Note that the gating factor is determined on a component-by-component basis, with the gating factor for each band being adjusted from analysis window to analysis window.

One exemplary use of a gating function is for processing input from a telephone headset. The headset may include two microphones configured to be spaced apart from one another and substantially co-linear with the primary direction of acoustic propagation of the speaker's voice. The microphones provide the input signals 512 to the prototype generation module 508. The gating function module 524 analyzes the input signals 512 by, for example, observing the phase difference between the two microphones. Based on the observed difference, the gating function 524 generates a gating factor $g^i$ for each frequency component i. For example, the gating factor $g^i$ may be 0 when the phase at both microphones is equal, indicating that the recorded sound is not the speaker's voice and instead an extraneous sound from the environment. Alternatively, when the phase between the input signals 512 corresponds to the acoustic propagation delay between the microphones, the gating factor may be 1.

In general, a variety of prototype synthesis approaches may be formulated as a gating of the input signals in which the gating is according to coefficients that range from 0 to 1, which can be expressed in vector-matrix form as:

$$d(t) = \begin{pmatrix} g_1 & g_2 \end{pmatrix} \begin{pmatrix} s_1(t) \\ s_2(t) \end{pmatrix},$$

with $0 \le g_1, g_2 \le 1$.

In another example, the gating function is configured for use in a hearing assistance device in a manner similar to that described in U.S. Patent Pub. 2009/0262969, titled "Hearing Assistance Apparatus", which is incorporated herein by reference. In such a configuration, the gating function is configured to provide more emphasis to a sound source that a user is facing than a sound source that a user is not facing.

In another example, the gating function is configured for use in a sound discrimination application in which the prototype is determined in a manner similar to the way that output components are determined in U.S. Patent Pub. 2008/0317260, titled "Sound Discrimination Method and Apparatus," which is incorporated herein by reference. For example, the output of the multiplier (42), which is the product of an input and a gain (40) (i.e., gating term) in the referenced publication, is applied as a prototype in the present approaches.

4 Output Estimation

Referring back to FIG. 1, the estimator 110 is configured to determine the output $\hat{d}(t)$ that best matches a prototype d(t). In some embodiments, the estimator 110 is a linear estimator that matches d(t) in a least squares sense. Referring back to FIG. 2, for at least some forms of estimator 110, this estimate may be performed on a component by component basis because generally, the errors in each component are uncorrelated resulting from the orthogonality of the components, and therefore each component can be estimated separately. The component estimator 210 forms the estimate $\hat{d}^i(t)$ as a weighted combination $\hat{d}^i(t)=w_1 s_1^{\,i}(t)+w_2 s_2^{\,i}(t)$. The weights $w_i$ are chosen for each analysis window by a least squares weight estimator 216 to form lowest error estimate based on auto and cross power spectra of the input signals $s_1(t)$ and $s_2(t)$.

The computation implemented in some examples of the estimation module may be understood by considering a desired (complex) signal d(t) and a (complex) input signal x(t) with the goal being to find the real coefficient h such that $|d(t)-hx(t)|^2$ is minimized. The coefficient that minimizes this error can be expressed as $$h = \frac{\mathrm{Re}(E\{d(t)x^*(t)\})}{E\{x(t)x^*(t)\}} = \frac{\mathrm{Re}(S_{DX})}{S_{XX}},$$

where the exponent * represents a complex conjugate and E{ } represents an average or expectation over time. Note that numerically, the computation of h can be unstable if $E(x^2(t))$ is small, so numerically, the estimate is adjusted adding a small value to the denominator as $$h = \frac{\mathrm{Re}(S_{DX})}{S_{XX} + \epsilon}.$$

The auto-correlation $S_{XX}$ and the cross-correlation $S_{DX}$ are estimated over a time interval.

As applied to the windowed analysis illustrated in FIG. 2, (using the notation [n] to refer to the $n^{th}$ window) given a windowed input signal $x_{[n]}(t)$ (i.e., the $n^{th}$ window of an input signal x(t)), one of the $s_k(t)$, and the corresponding prototype $d_{[n]}(t)$, a running estimate of the auto and cross correlations within that window is formed as $$\tilde{S}_{XX}^{[n]}=\mathrm{ave}\{|x_{[n]}(t)|^2\} \text{ and } \tilde{S}_{DX}^{[n]}=\mathrm{ave}\{d_{[n]}(t)x_{[n]}^*(t)\}.$$

Note that in the case that a component can be sub-sampled to a single sample per window, these expectations may be as simple as a single complex multiplication each.

In order to obtain robust estimates of the auto- and cross-correlation coefficients, a time averaging or filtering over multiple time windows may be used. For example, one form of filter is a decaying time average computed over past windows:

$$\tilde{S}_{XX}^{[n]}=(1-a)\cdot|x_{[n]}(t)|^2+a\tilde{S}_{XX}^{[n-1]}$$

for example, with a equal to 0.9, which with a window hop time of 11.6 ms corresponds to an averaging time constant of approximately 100 ms. Other causal or lookahead, finite impulse response or infinite impulse response, stationary or adaptive, filters may be used. Adjustment with the factor $\epsilon$ is then applied after filtering.

Figure 6:
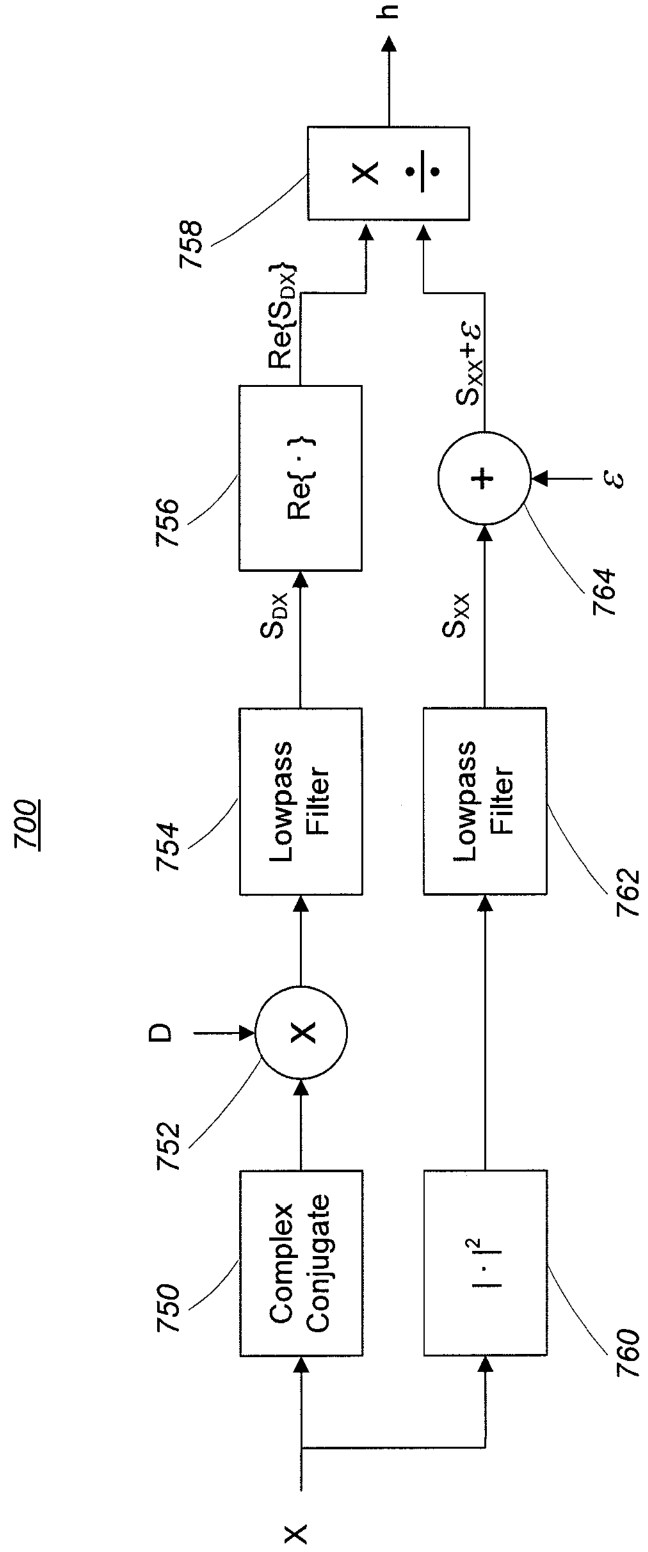
FIG. 6 is a block diagram of a system configured to determine upmixing coefficient h.

Referring to FIG. 6, one embodiment 700 of the least squares weight estimation module 216 is illustrated for the case of estimating a weight h for forming the prototype based on a single component. The component of the input is identified as X in the figure (e.g., a component $s_i(t)$ downsampled to a single sample per window), and the prototype component is identified as D in the figure. FIG. 6 represents a discrete time filtering approach that is updated once every window period. In particular, $S_{DX}$ is calculated along the top path by computing the complex conjugate 750 of X, multiplying 752 the complex conjugate of X by D, and then low-pass filtering 754 that product along the time dimension. The real part of $S_{DX}$ is then extracted. $S_{XX}$ is calculated along the bottom path by squaring the magnitude 760 of X and then low-pass filtering 762 the result along the time dimension. A small value $\epsilon$ is then added 764 to $S_{XX}$ to prevent division by zero. Finally, h is calculated by dividing 758 Re{ $S_{DX}$} by $S_{XX}+\epsilon$.

The computation implemented by the estimation module may be further understood by considering a desired signal d(t) formed as combination of two inputs x(t) and y(t) with the goal being to find the real coefficients h and g such that $|d(t)-hx(t)-gy(t)|^2$ is minimized. Note that the using real coefficients is not necessary, and in alternative embodiments with complex coefficients, the formulas for the coefficient values are different (e.g., for complex coefficients, the Re( ) operation is dropped on all terms). In this case with real coefficients, the coefficients that minimize this error can be expressed as $$\begin{bmatrix} h \\ g \end{bmatrix} = \begin{bmatrix} E\{|x(t)|^2\} & \mathrm{Re}(E\{x(t)y^*(t)\}) \\ \mathrm{Re}(E\{y(t)x^*(t)\}) & E\{|y(t)|^2\} \end{bmatrix}^{-1} \begin{bmatrix} \mathrm{Re}(E\{d(t)x^*(t)\}) \\ \mathrm{Re}(E\{d(t)y^*(t)\}) \end{bmatrix} = \begin{bmatrix} S_{XX} & \mathrm{Re}(S_{XY}) \\ \mathrm{Re}(S_{YX}) & S_{YY} \end{bmatrix}^{-1} \begin{bmatrix} \mathrm{Re}(S_{DX}) \\ \mathrm{Re}(S_{DY}) \end{bmatrix}.$$

As introduced above, each of the auto- and cross-correlation terms are filtered over a range of windows and adjusted prior to computation.

The matrix formulation shown above for two channels is readily modified for any number of input channels. For example, in the case of a vector of prototypes $\vec{d}(t)$ and a vector of input signals $\vec{x}(t)$, a matrix of weighting coefficients H may be computed to form the estimate using the vector-matrix formula $$\vec{d}(t)=H\vec{x}(t)$$

by computing the real matrix H as $$H=[Re(S_{\vec{X}\vec{X}})]^{-1}[Re(S_{\vec{D}\vec{X}})]$$

where $$S_{\vec{D}\vec{X}}=Re(E\{\vec{d}(t)\vec{x}^H(t)\}) \text{ and } S_{\vec{X}\vec{X}}=Re(E\{\vec{x}(t)\vec{x}^H(t)\})$$

and $\vec{d}^H$ indicates the transpose of the complex conjugate, and the covariance terms are computed and filtered and adjusted on a component-wise basis as described above.

Figure 3A:
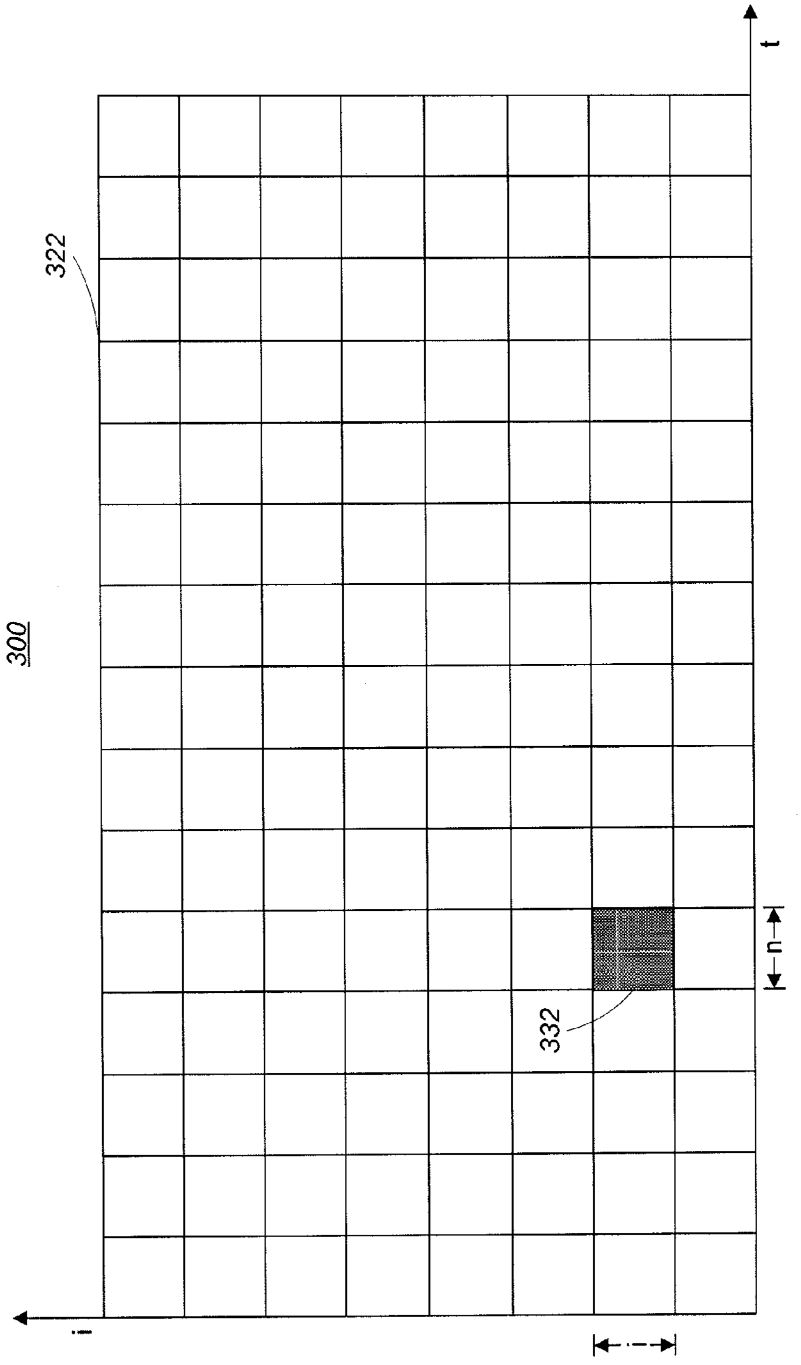
FIG. 3A shows a time-component representation for a prototype.
Figure 3B:
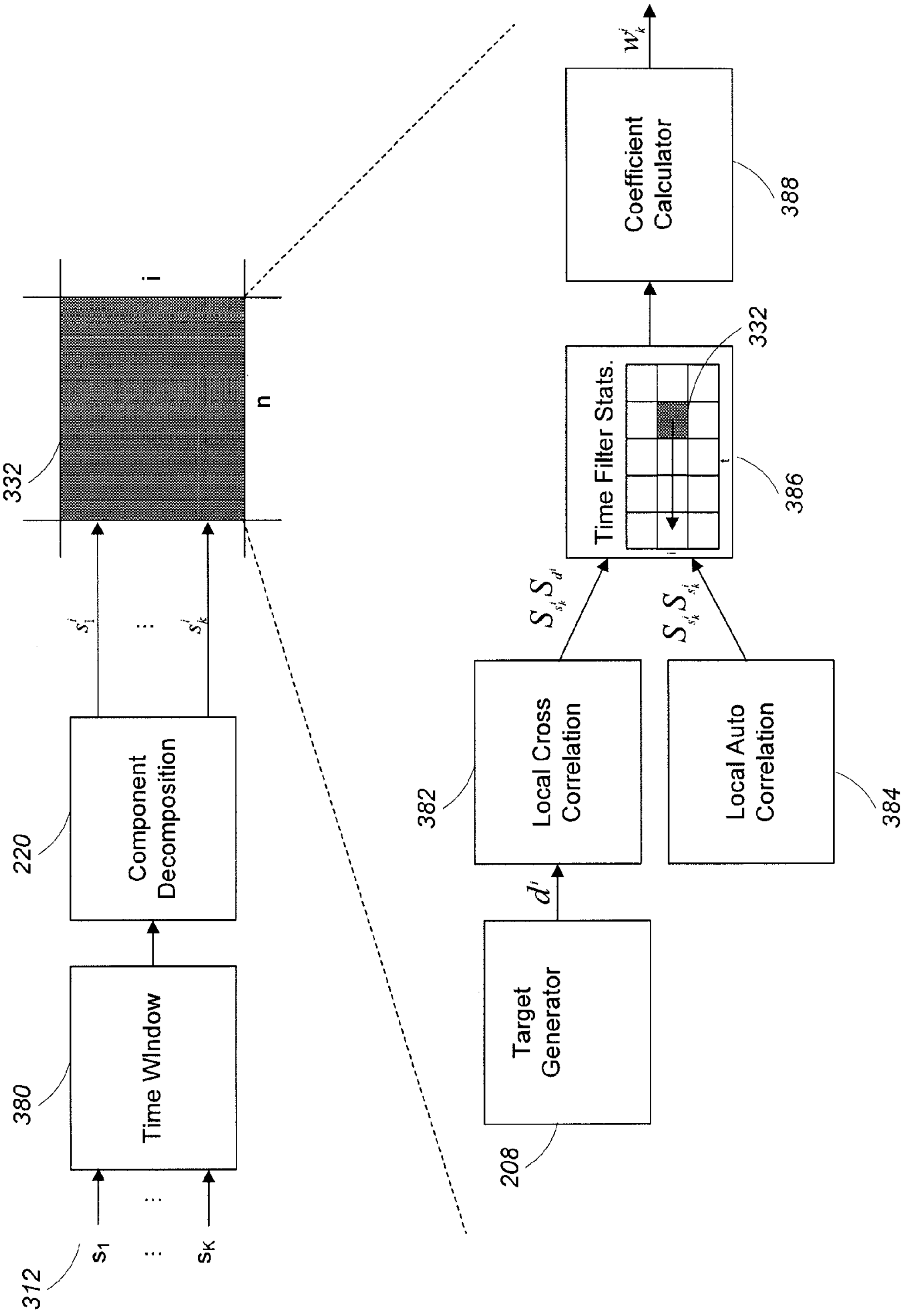
FIG. 3B is a detailed view of a single tile of the time-component representation.

FIG. 3A is a graphical representation 300 of a time-component representation 322 for all the input channels $s_k(t)$ and the one or more prototypes d(t). Each tile 332 in the representation 300 is associated with one window index n and one component index i. FIG. 3B is a detailed view of a single tile 332. In particular FIG. 3B shows that the tile 332 is created by first time windowing 380 each of the input signals 312. The time windowed section of each input signal 312 is then processed by a component decomposition module 220. For each tile 332, an estimate of the auto 384 and cross 382 correlations of the input channels 312, as well as cross correlations 382 of each of the inputs and each of the outputs is computed, and then filtered 386 over time and adjusted to preserve numerical stability. Then each of the weighting coefficients $w_k^i$ are computed according a matrix formula of the form shown above.

Note that in the description above, the smoothing of the correlation coefficients is performed over time. In some examples, the smoothing is also across components (e.g., frequency bands). Furthermore, the characteristics of the smoothing across components may not be equal, for example, with a larger frequency extent at higher frequencies than at lower frequencies.

5 Component Reconstruction

Because the component decomposition module 220 (e.g. a DFT filter bank) has linear phase, the single channel upmixing outputs have the same phase and can be recombined without phase interaction, to effect various degrees of signal separation.

The component reconstruction is implemented in a component reconstruction module 230. The component reconstruction module 230 performs the inverse operation of the component decomposition module 220, creating a spatially separated time signal from a number of components 222.

6 Examples

Figure 4B:
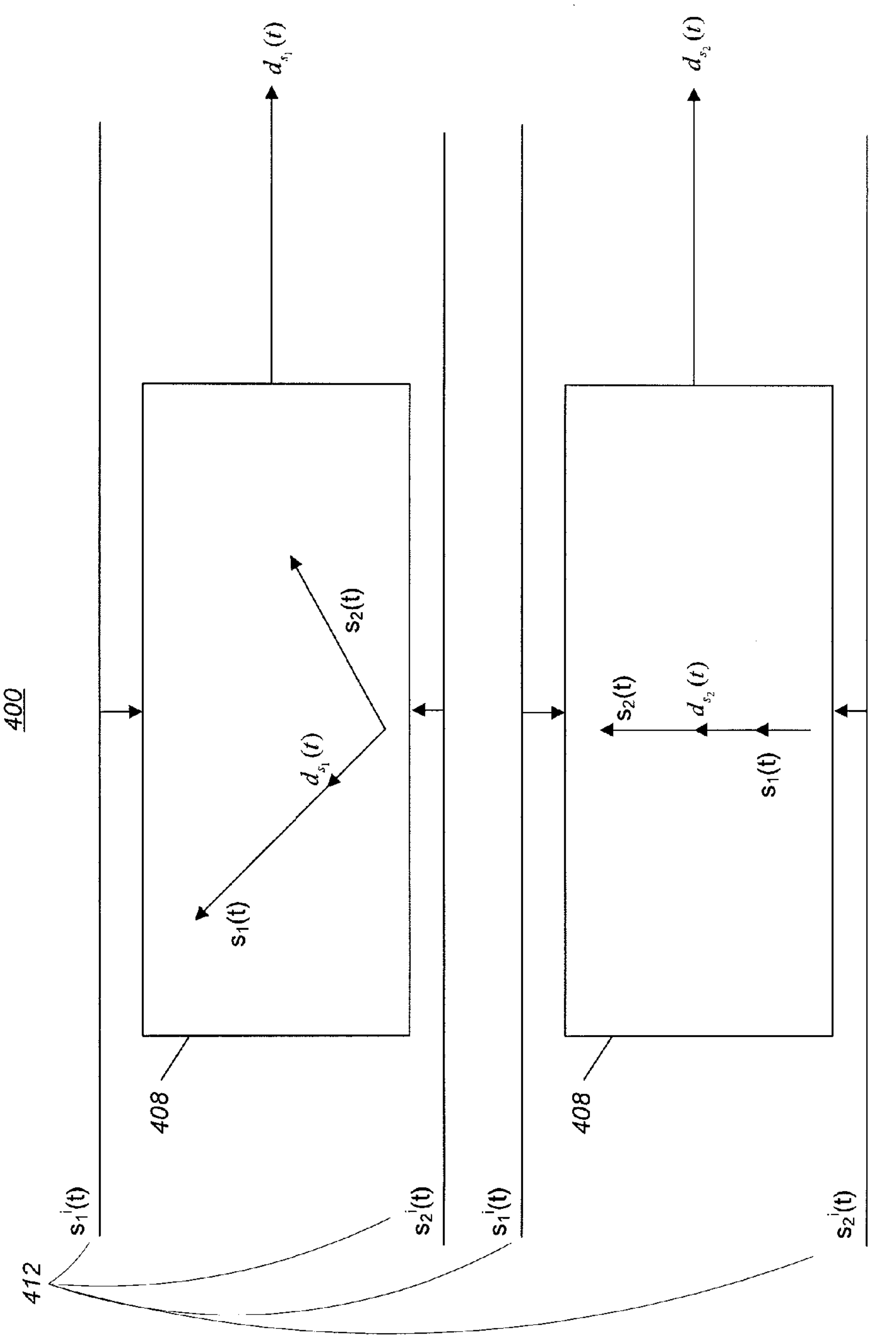
FIG. 4B is a block diagram showing two exemplary "side-only" synthetic prototypes $d^i(t)$.

In Section 3, with the input signals $s_1(t)$ and $s_2(t)$ corresponding to left, l(t), and right, r(t), signals, respectively, the prototype d(t) is suitable for a center channel, c(t). In one example, a similar approach may be applied to determine prototype signals for "left only", $l_o(t)$, and "right only", $r_o(t)$, signals. Referring to FIG. 4B, exemplary local prototypes for "side-only" channels are illustrated. Note that in other examples, local prototypes may be derived from a single channel, while in other examples they may be derived from two or more than two channels.

The following formulas define one form of such exemplary prototypes:

$$l_o(t) = l(t)\cdot\left(1 - \frac{\min(|l(t)|, |r(t)|)}{|l(t)|}\right)$$

and, $$r_o(t) = r(t)\cdot\left(1 - \frac{\min(|l(t)|, |r(t)|)}{|r(t)|}\right)$$

where the component index i is omitted in the formula above for clarity. A part of each of the input signals 412 is combined to create the center prototype. The local "side-only" prototypes are the remainder of each input signal 412 after contributing to the center channel. For example, referring to $l_o(t)$, if l(t) is smaller than r(t), the prototype is equal to zero. When l(t) is greater than r(t), the prototype has a length that is the difference in the lengths of the input signals 412, and the same direction as input l(t).

Figure 4C:
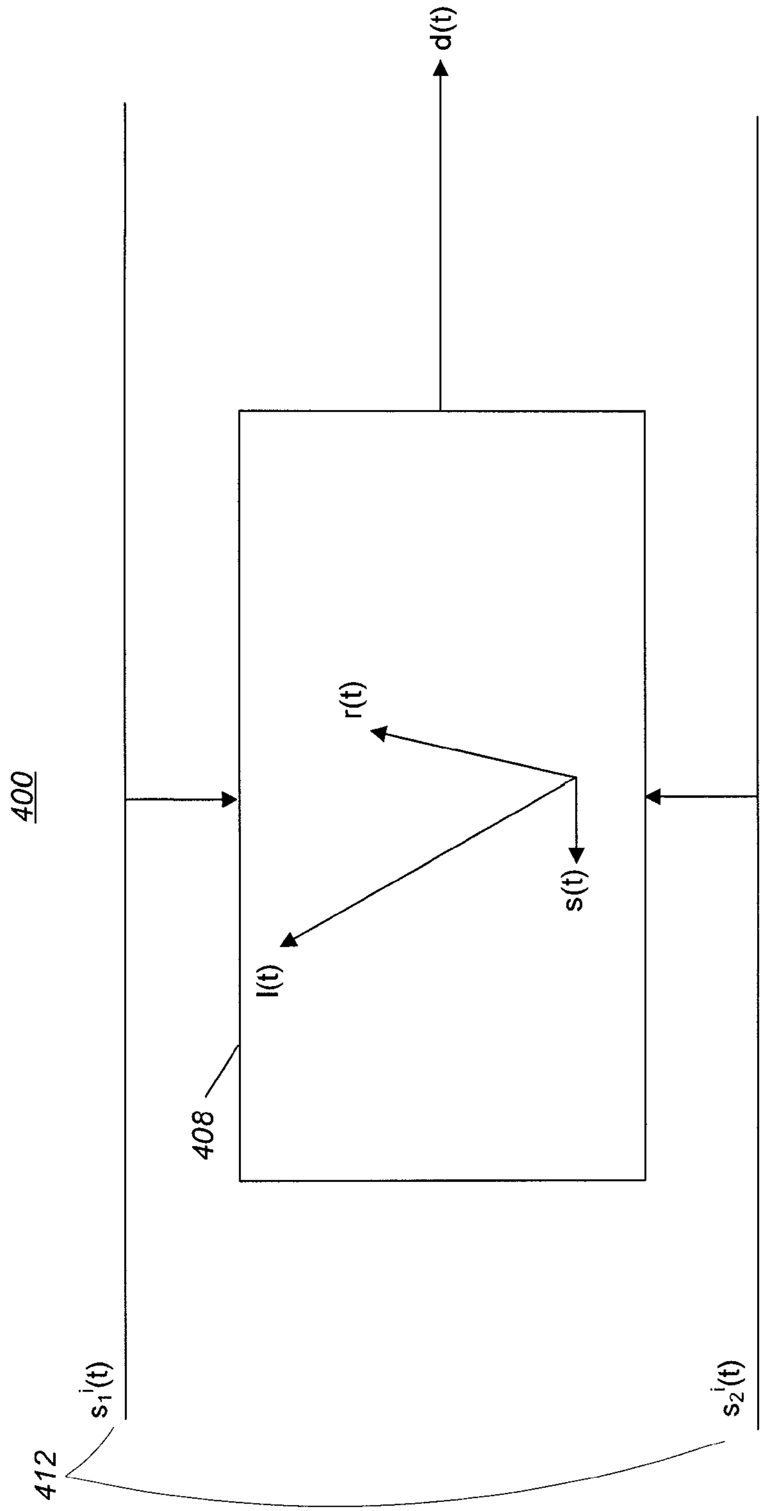
FIG. 4C is a block diagram showing an exemplary surround channel synthetic prototype $d^i(t)$.

Referring to FIG. 4C, an exemplary local prototype for a "surround" channel is illustrated. "Surround" prototypes can be used for upmixing based on difference (antiphase) information. The following formula defines the "surround" channel local prototype:

$$s(t) = \frac{1}{2}\left(\frac{l(t)}{|l(t)|} - \frac{r(t)}{|r(t)|}\right)\min(|l(t)|, |r(t)|)$$

where the component index i is omitted in the formula above for clarity. This local prototype is symmetric with the center channel local prototype. It is maximal when the input signals 412 are equal in level and out of phase, and it decreases as the level differences increase or the phase differences decrease.

Figure 7:
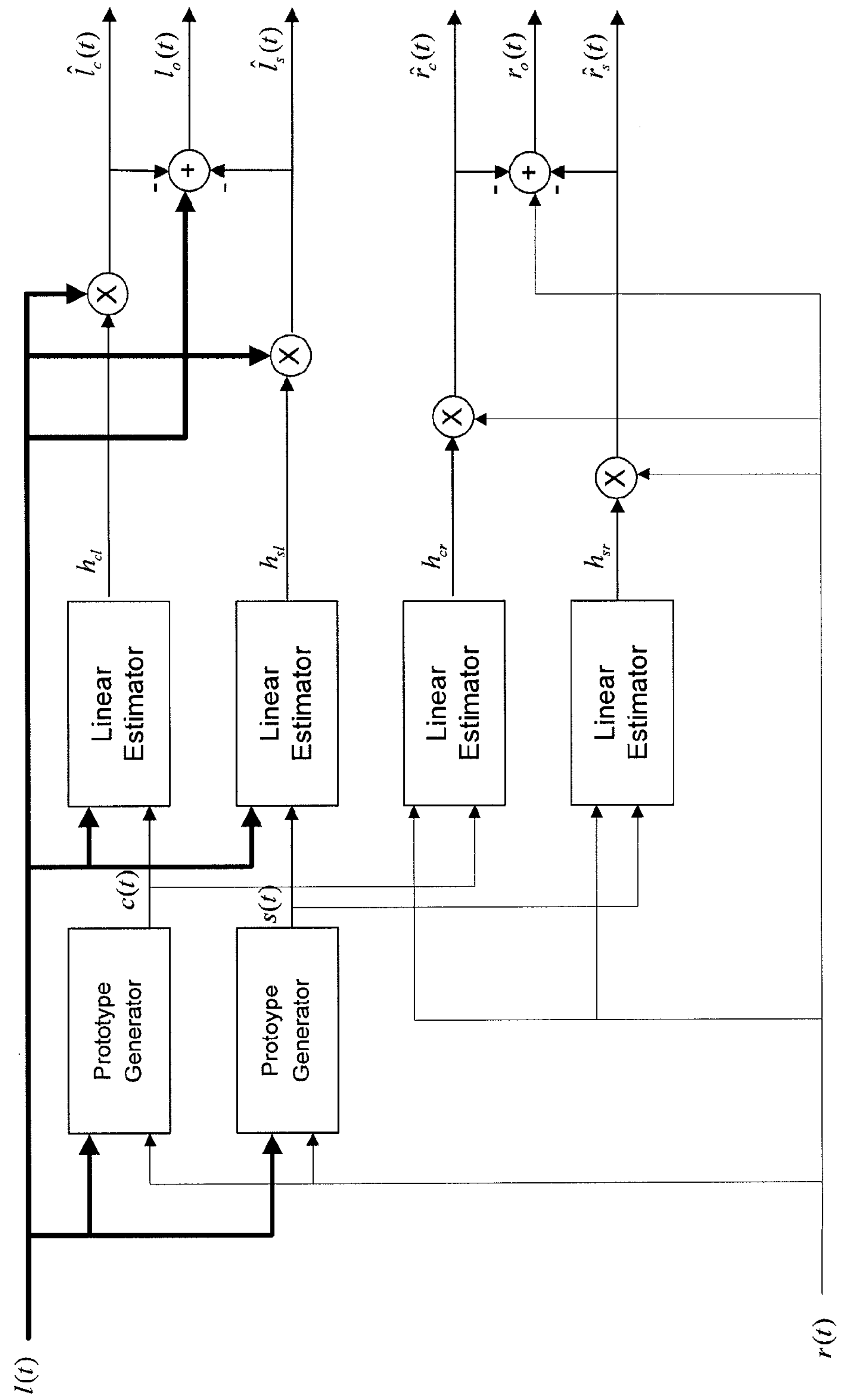
FIG. 7 is a block diagram illustrating how six upmixing channels can be determined by using two local prototypes.

Given prototype signals, for example, as described above, examples of approaches for estimating those prototype signals may differ in terms of the inputs combined to form the estimate. For instance, as illustrated in FIG. 7, the prototype d(t), referred to here as c(t) as the center channel prototype can yield two estimates, $\hat{l}(t)$ and $\hat{r}_c(t)$, each of which is formed as a weighting of a single input as $$\hat{l}_c(t)=h_{cl}l(t) \text{ and } \hat{r}_c(t)=h_{cr}r(t),$$

respectively, to represent the portion of the center prototype contained in the left and the right input channels, respectively.

Using the definitions of the covariance and cross covariance estimates above, these coefficients are determined as follows:

$$h_{cl} = \frac{\mathrm{Re}\{S_{CL}\}}{S_{LL}}; \text{ and}$$

$$h_{cr} = \frac{\mathrm{Re}\{S_{CR}\}}{S_{RR}}.$$

For the definition of the surround channel, s(t), two estimates can similarly be formed as $$\hat{l}_s(t)=h_{sl}l(t) \text{ and } \hat{r}_s(t)=-h_{sr}r(t),$$

where the minus sign relates to the phase asymmetry of the surround prototype, and the coefficients being determined as $$h_{sl} = \frac{\mathrm{Re}\{S_{SL}\}}{S_{LL}} \text{ and}$$

$$h_{sr} = \frac{\mathrm{Re}\{S_{SR}\}}{S_{RR}}$$

In this example, there are four upmixed channels as defined above:

$$\hat{l}_c(t),\ \hat{r}_c(t),\ \hat{l}_s(t), \text{ and } \hat{r}_s(t).$$

Two additional channels are calculated as the residual left and right signals after removing the single-channel center and surround components:

$$l_o(t)=l(t)-\hat{l}_c(t)-\hat{l}_s(t), \text{ and}$$

$$r_o(t)=r(t)-\hat{r}_c(t)-\hat{r}_s(t),$$

for a total of six output channels derived from the original two input channels.

In another example, upmixing outputs are generated by mixing both left and right input into each upmixer output. In this case, least squares is used to solve for two coefficients for each upmixer output: a left-input coefficient and a right-input coefficient. The output is generated by scaling each input with the corresponding coefficient and summing.

In this example, if the center and surround channels are approximated as:

$$\hat{c}(t)=g_{cl}l(t)+g_{cr}r(t), \text{ and } \hat{s}(t)=g_{sl}l(t)+g_{sr}r(t),$$

respectively, then the coefficients can be computed as $$H = \begin{bmatrix} g_{cr} & g_{cl} \\ g_{sr} & g_{sl} \end{bmatrix} = \left[\mathrm{Re}\left(S_{\vec{X}\vec{X}}\right)^{-1}\mathrm{Re}\left(S_{\vec{D}\vec{X}}\right)\right],$$

where $$\vec{x}(t) = \begin{bmatrix} r(t) \\ l(t) \end{bmatrix} \text{ and } \vec{d}(t) = \begin{bmatrix} c(t) \\ s(t) \end{bmatrix}.$$

Left-only and right-only signals are then computed by removing the components of the center and surround signals from the input signals, as introduced above. Note that in other examples, the left only and right only channels may be extracted directly rather that computing them as a remainder after subtraction of other extracted signals.

7 Alternatives

A number of example of a local prototype systhesis, for example for a center channel are presented above. However, a variety of heuristics, physical gating schemes, and signal selection algorithms could be employed to create local prototypes.

It should be understood that the prototype signals d(t), for example, as illustrated in FIG. 1 and FIG. 2, do not necessarily have to be calculated explicitly. In some examples, formulas are determined to compute the auto and cross power spectra, or other characterizations of prototype signals, that are then used in determining weights $w_k$ 217 used in an estimator 210 without actually forming the signal d(t) 209, while still yielding the same or substantially same result as would have been obtained through explicit computation of the prototype. Similarly, other forms of estimator do not necessarily use weighted input signals to form the estimated signals. Some estimators do not necessarily make use of explicitly formed prototype signals and rather use signal or data characterizing the prototypes of the target signal (e.g., using values representing statistical properties, such as auto- or cross correlation estimate, moments, etc., of the prototype) in such a way that the output of the estimator is the estimate according to the particular metric used by the estimator (e.g., a least squares error metric).

It should also be understood that in some examples, the estimation approach can be understood as a subspace projection, which the subspace is defined by the set of input signals used as the basis for the output. In some examples, the prototypes themselves are a linear function of the input signals, but may be restricted to a different subspace defined by a different subset of input signals than is used in the estimations phase.

In some examples, the prototype signals are determined using different representations than are used in the estimation. For example, the prototypes may be determined using different or no component decompositions that are not the same as the component decomposition used in the estimation phase.

It should also be understood that "local" prototypes may not necessarily be strictly limited to prototypes computed from input signals in a single component (e.g., frequency band) and a single time period (e.g., a single window of the input analysis). For instance, there may be limited used of nearby components (e.g., components that are perceptually near in time and/or frequency) while still providing relatively more locality of prototype synthesis than the locality of the estimation process.

The smoothing introduced by the windowing of the time data could be further extended to masking based time-frequency smoothing or non linear, time invariant (LTI) smoothing.

The coefficient estimation rules could be modified to enforce a constant power constraint. For instance, rather than computing residual "side-only" signals, multiple prototypes can be simultaneously estimated while preserving a total power constraints such that the total left and right signals are maintained over the sum of output channels.

Given a stereo pair of input signals, L and R, the input space may be rotated. Such a rotation could produce cleaner left only and right only spatial decompositions. For example, left-plus-right and left-minus-right could be used as input signals (input space rotated 45 degrees). More generally, the input signals may be subject to a transformation, for instance, a linear transformation, prior to prototype synthesis and/or output estimation.

8 Applications

The method described in this application can be applied in a variety of applications where input signals need to be spatially separated in a low latency and low artifact manner.

The method could be applied to stereo systems such as home theater surround sound systems or automobile surround sound systems. For instance, the two channel stereo signals from a compact disc player could be spatially separated to a number of channels in an automobile.

The described method could also be used in telecommunication applications such as telephone headsets. For example, the method could be used to null unwanted ambient sound from the microphone input of a wireless headset.

9 Implementations

Examples of the approaches described above may be implemented in software, in hardware, or in a combination of hardware and software. The software may include a computer readable medium (e.g., disk or solid state memory) that holds instructions for causing a computer processor (e.g., a general purpose processor, digital signal processor, tec.) to perform the steps described above.

It is to be understood that the foregoing description is intended to illustrate and not to limit the scope of the invention, which is defined by the scope of the appended claims. Other embodiments are within the scope of the following claims.

What is claimed is:

1. A method for operating signal processing circuitry to form output signals from a plurality of input signals comprising using the signal processing circuitry for:

accepting the plurality of input signals;

using a prototype generator to determine a characterization of one or more prototype signals from multiple of the input signals; and using an estimator to process each prototype signal of the one or more prototype signals including processing said prototype signal to form a corresponding output signal as an estimate of said prototype signal, the output signal comprising a combination of one or more of the input signals;

wherein forming the output signal as an estimate of a corresponding one of the one or more prototype signals as a combination of one or more of the input signals includes computing statistics relating the prototype signal and the one or more input signals, and determining a weighting coefficient to apply to each of said input signals.

2. The method of claim 1 wherein determining the characterization of the prototype signals includes determining the prototype signals.

3. The method of claim 1 wherein determining the characterization of the prototype signals includes determining statistical characteristics of the prototype signals.

4. The method of claim 1 wherein determining the characterization of a prototype signal includes forming said data based on a temporally local analysis of the input signals.

5. The method of claim 4 wherein determining the characterization of a prototype signal further includes forming said data based on a frequency local analysis of the input signals.

6. The method of claim 4 wherein the forming of the estimate of the prototype is based on a more global analysis of the input and prototype signals than the local analysis in forming the prototype signal.

7. The method of claim 1 wherein the synthesis of a prototype signal includes a non-linear function of the input signals.

8. The method of claim 7 wherein forming the output signal as an estimate of the prototype comprises forming a least squared error estimate of the prototype signal.

9. The method of claim 1 wherein synthesis of a prototype signal includes a gating of one or more of the input signals.

10. The method of claim 1 wherein forming the output signal as an estimate of the prototype includes forming minimum error estimate of the prototype.

11. The method of claim 10 wherein forming the minimum error estimate comprises forming a least-squared error estimate.

12. The method of claim 1 wherein the statistics include cross power statistics between the prototype signal and the one or more input signals, and auto power statistics of the one or more input signals.

13. The method of claim 1 wherein computing the statistics includes averaging locally computed statistics over time and/or frequency.

14. The method of claim 1 wherein the signal processing circuitry is further used for decomposing each input signal into a plurality of components, and wherein determining the data characterizing the synthesis of the prototype signals includes forming data characterizing component decompositions of each prototype signal into a plurality of prototype components;

forming each output signal as an estimate of a corresponding one of the prototype signals includes forming a plurality of output component estimates as transformations of corresponding components of one or more input signals; and forming the output signals includes combining the formed output component estimates to form the output signals.

15. The method of claim 14 wherein forming the component decomposition includes forming a frequency-based decomposition.

16. The method of claim 14 wherein forming the component decomposition includes forming a substantially orthogonal decomposition.

17. The method of claim 14 wherein forming the component decomposition includes applying at least one of a Wavelet transform, a uniform bandwidth filter bank, a non-uniform bandwidth filter bank, a quadrature mirror filter bank, and a statistical decomposition.

18. The method of claim 14 wherein forming a plurality of output component estimates as transformations of correspond components of one or more input signals comprises scaling the components of the input signals to form the components of the output signals.

19. The method of claim 1 wherein the input signals comprise multiple input audio channels of an audio recording, and wherein the output signals comprise additional upmixed channels.

20. The method of claim 19 wherein the multiple input audio channels comprise at least a left audio channel and a right audio channel, and wherein the additional upmixed channels comprise at least one of a center channel and a surround channel.

21. The method of claim 1 further comprising accepting the plurality of input signals from a microphone array, and synthesizing the one or more prototype signals according to differences among the input signals.

22. The method of claim 21 wherein forming the prototype signal according to differences among the input signals includes determining a gating value according to gain and/or phase differences and applying the gating value to one or more of the input signals to determine the prototype signal.

23. A system for processing a plurality of input signals comprising signal processing circuitry, said circuitry configured to include:

a prototype generator configured to accept multiple of the input signals and to provide a characterization of a prototype signal from said multiple input signals; and an estimator configured to accept the characterization of the prototype signal and to form an output signal as an estimate of the prototype signal, the output signal comprising a combination of one or more of the input signals;

wherein forming the output signal as an estimate of a corresponding one of the one or more prototype signals as a combination of one or more of the input signals includes computing statistics relating the prototype signal and the one or more input signals, and determining a weighting coefficient to apply to each of said input signals.

24. The system of claim 23 wherein the prototype signal comprises a non-linear function of the input signals.

25. The system of claim 24 wherein the estimate of the prototype signal comprises a least squared error estimate of the prototype signal.

26. The system of claim 23 further comprising a component analysis module for forming a multiple component decomposition of each of the input signals, and a reconstruction module for reconstructing the output signal from a component decomposition of the output signal.

27. The system of claim 26 wherein the prototype generator and the estimator are each configured to operate on a component by component basis.

28. The system of claim 26 wherein the prototype generator is configured, for each component, to perform a temporally local processing of the input signals to determine a characterization of a component of the prototype signal.

29. The system of claim 23 wherein the prototype generator is configured to accept multiple input audio channels, and wherein the estimator is configured to provide an output signal comprising an additional upmixed channel.

30. The system of claim 23 wherein the prototype generator is configured to accept multiple input audio channels from a microphone array, and wherein the prototype generator is configured to synthesize one or more prototype signals according to differences among the input signals.

31. The system of claim 23 wherein the output signal formed is a real combination of more than one of the input signals.

32. The system of claim 23 wherein the output signal formed is a complex combination of the one or more input signals.

* * * * *